US012707179B2

(12) United States Patent
Xue et al.

(10) Patent No.: US 12,707,179 B2
(45) Date of Patent: Aug. 11, 2026

(54) MAGNETIC-RESONANCE COMPATIBLE EARPHONE, MAGNETIC-RESONANCE COMPATIBLE INTERCOM SYSTEM AND HEAD COIL APPARATUS

(71) Applicant: Siemens Healthcare GmbH, Erlangen (DE)

(72) Inventors: Ting Qiang Xue, Shenzhen (CN); Jianmin Wang, Shenzhen (CN); Markus Vester, Nuremberg (DE)

(73) Assignee: Siemens Healthineers AG, Erlangen (DE)

( * ) Notice: Subject to any disclaimer, the term of this patent is extended or adjusted under 35 U.S.C. 154(b) by 272 days.

(21) Appl. No.: 17/993,110

(22) Filed: Nov. 23, 2022

(65) Prior Publication Data

US 2023/0164471 A1 May 25, 2023

(30) Foreign Application Priority Data

Nov. 25, 2021 (CN) ........................ 202111415536.6

(51) Int. Cl.
*H04R 1/10* (2026.01)
*G06F 3/16* (2006.01)
(Continued)

(52) U.S. Cl.
CPC ........... *H04R 1/1008* (2013.01); *G06F 3/162* (2013.01); *H04R 1/08* (2013.01); *H04R 1/1041* (2013.01);
(Continued)

(58) Field of Classification Search
CPC ...... H04R 1/26; H04R 2201/34; H04R 1/023; H04R 1/345; H04R 9/06; H04R 1/025; H04R 1/403; H04R 3/12; H04R 3/14; H04R 7/02; H04R 9/04; H04R 2430/00; H04R 2430/01; H04R 2499/13; H04R 5/02;
(Continued)

(56) References Cited

U.S. PATENT DOCUMENTS

2014/0111206 A1 4/2014 Kwon
2015/0341710 A1* 11/2015 Gladwin .................. H04R 1/24
381/152
(Continued)

FOREIGN PATENT DOCUMENTS

CN 103781000 A 5/2014
CN 110603814 A 12/2019

*Primary Examiner* — Lun-See Lao
(74) *Attorney, Agent, or Firm* — Banner & Witcoff, Ltd.

(57) ABSTRACT

A magnetic-resonance compatible earphone is provided comprising an earphone body, a diaphragm, and a drive coil. The diaphragm is arranged on the earphone body and configured to generate sound through vibration. The drive coil is arranged on the earphone body and used to receive audio current. The drive coil that has received the audio current is able to generate a Lorentz force under the action of a main magnetic field of a magnetic resonance imaging system. The drive coil is able to drive the diaphragm to vibrate by means of the Lorentz force generated by the drive coil. The magnetic-resonance compatible earphone has good magnetic resonance compatibility. In addition, a magnetic-resonance compatible intercom system and a head coil apparatus comprising the magnetic-resonance compatible earphone are also provided.

19 Claims, 6 Drawing Sheets

(51) Int. Cl.
*H04R 1/08* (2006.01)
*H04R 9/04* (2006.01)
*H04R 9/06* (2006.01)

(52) U.S. Cl.
CPC ........... *H04R 1/1075* (2013.01); *H04R 9/046* (2013.01); *H04R 9/06* (2013.01); *H04R 2420/07* (2013.01)

(58) Field of Classification Search
CPC .......... H04R 5/023; H04R 5/04; H04R 9/046; H04R 1/00; H04R 1/24; H04R 2499/11; H04R 7/26; H04R 9/02; H04R 9/025; H04R 9/063; H04R 1/08; H04R 1/1008; H04R 1/1041; H04R 1/1075; H04R 1/1083; H04R 2420/07; H04R 2460/01; H04R 5/033; H04R 7/04; H04R 9/047; H04S 1/007; H04S 2400/05; H04S 2400/13; H04S 2420/01; H04S 7/30; H04S 7/302; G10K 11/30; G06F 3/162
USPC .................................................... 381/74, 312
See application file for complete search history.

(56) References Cited

U.S. PATENT DOCUMENTS

| | | | | |
|---|---|---|---|---|
| 2017/0295431 | A1* | 10/2017 | Son ...................... | H04R 5/0335 |
| 2018/0352323 | A1* | 12/2018 | Ji ............................ | H04R 3/08 |
| 2020/0374615 | A1 | 11/2020 | Anderson et al. | |
| 2022/0159396 | A1* | 5/2022 | Fryer ....................... | H04R 5/02 |

* cited by examiner 80 sound receiving unit
81 microphone
82 first audio codec
83 first audio processor
84 first wireless communication module
90 sound transmitting unit
91 second audio processor
92 second audio codec
93 second wireless communication module
94 noise reduction module
95 constant-current audio amplifier
100 magnetic-resonance compatible headphone

MAGNETIC-RESONANCE COMPATIBLE EARPHONE, MAGNETIC-RESONANCE COMPATIBLE INTERCOM SYSTEM AND HEAD COIL APPARATUS

CROSS-REFERENCE TO RELATED APPLICATIONS

The present application claims priority to and the benefit of China patent application no. CN 202111415536.6, filed on Nov. 25, 2021, the contents of which are incorporated herein by reference in its entirety.

TECHNICAL FIELD

The disclosure relates to an earphone and, in particular, to a magnetic-resonance compatible earphone, as well as a magnetic-resonance compatible intercom system and head coil apparatus comprising the same.

BACKGROUND

Magnetic resonance imaging (MRI) is a medical imaging technology that can be used to diagnose diseases. When an examination subject is located in the detection region of a magnetic resonance imaging system and undergoing examination, the operator needs to issue action instructions to the examination subject through an intercom system. However, traditional earphones (such as moving coil or moving iron earphones) do not meet the compatibility requirements of the main magnetic field and RF magnetic field of magnetic resonance due to the inclusion of permanent magnet components.

SUMMARY

An object of the present disclosure is to provide a magnetic-resonance compatible earphone having magnetic resonance compatibility. Another object of the present disclosure is to provide a magnetic-resonance compatible intercom system having magnetic resonance compatibility. Still another object of the present disclosure is to provide a head coil apparatus that has the function of an earphone having magnetic resonance compatibility.

The disclosure provides a magnetic-resonance compatible earphone comprising an earphone body, a diaphragm, and a drive coil. The diaphragm is arranged on the earphone body and configured to generate sound through vibration. The drive coil is arranged on the earphone body and configured to receive audio current. The drive coil that has received the audio current is configured to generate a Lorentz force under the action of a main magnetic field of a magnetic resonance imaging system. The drive coil is configured to drive the diaphragm to vibrate by means of the Lorentz force generated by the drive coil.

The magnetic-resonance compatible earphone utilizes the main magnetic field of the magnetic resonance imaging system to cause the drive coil to generate a Lorentz force, thereby driving the diaphragm to vibrate. The magnetic-resonance compatible earphone does not need to use permanent magnet components, and has good magnetic resonance compatibility.

In another embodiment of the magnetic-resonance compatible earphone, the magnetic-resonance compatible earphone further comprises an elastic sheet and a transmission member. The elastic sheet is provided on the earphone body. The drive coil is fixed to the elastic sheet. The drive coil is configured to drive the elastic sheet to elastically deform by means of the Lorentz force generated by the drive coil. The transmission member connects the elastic sheet and the diaphragm. The elastic sheet is configured to drive the transmission member to move through elastic deformation. The moving transmission member is configured to drive the diaphragm to vibrate. This structure is simple, with good stability.

In yet another embodiment of the magnetic-resonance compatible earphone, the elastic sheet is in the form of a sheet and arranged perpendicular to an output direction. An edge of the elastic sheet is fixed to the earphone body. The elastic sheet has a connecting portion, the connecting portion being configured to move in a direction parallel to the output direction as the elastic sheet deforms elastically. The transmission member extends in the output direction, having one end connected to the connecting portion and another end connected to the diaphragm. This structure is simple, with good stability.

In a further embodiment of the magnetic-resonance compatible earphone, the drive coil has at least one annular winding unit. The winding unit is wound along a plane perpendicular to the output direction. One end of the winding unit is disposed in a set (i.e. predetermined) magnetic field direction perpendicular to the output direction, which is fixed to the connecting portion, and the winding unit extends toward the edge of the elastic sheet in a direction parallel to the set magnetic field direction. This structure is simple and easy to process.

In yet another embodiment of the magnetic-resonance compatible earphone, the drive coil has at least one pair of winding units. The pair of winding units are arranged as mirror images (i.e. symmetrically) across a plane perpendicular to the set magnetic field direction. Audio currents flow in opposite directions in the pair of winding units, so that the directions of the forces acting on the connecting portion are the same.

In yet another embodiment of the magnetic-resonance compatible earphone, the pair of winding units is formed by continuously winding a length of conductive wire. This allows induced potentials generated under gradient magnetic fields to cancel each other out.

In yet another embodiment of the magnetic-resonance compatible earphone, the diaphragm and the drive coil are integrated as a flexible circuit board. The overall structure can thereby be made more compact.

The present disclosure also provides a magnetic-resonance compatible intercom system comprising a sound receiving unit and a sound transmitting unit. The sound receiving unit comprises a microphone, a first audio codec, and a first audio processor. The microphone is configured to convert a sound signal into an analog signal. The first audio codec is configured to generate a digital signal based on the analog signal generated by the microphone. The first audio processor is configured to generate an output signal based on the digital signal generated by the first audio codec. The sound transmitting unit comprises a second audio processor, a second audio codec, and a magnetic-resonance compatible earphone as described above. The second audio processor is configured to generate an input signal based on the output signal generated by the first audio processor. The second audio codec is configured to generate an analog signal based on the input signal. The magnetic-resonance compatible earphone is configured to emit sound according to the analog signal generated by the second audio codec. The magnetic-resonance compatible earphone of the magnetic-resonance compatible intercom system utilizes the main magnetic field of the magnetic resonance imaging system to cause the drive coil to generate a Lorentz force, thereby driving the diaphragm to vibrate. The magnetic-resonance compatible earphone does not need to use permanent magnet components, so the magnetic-resonance compatible intercom system has good magnetic resonance compatibility.

In another embodiment of the magnetic-resonance compatible intercom system, the magnetic-resonance compatible intercom system further comprises a first wireless communication module and a second wireless communication module. The first wireless communication module is connected to the first audio processor. The second wireless communication module is connected to the second audio processor. The first audio processor and the second audio processor are configured to transmit signals by wireless communication via the first wireless communication module and the second wireless communication module. This enables wireless intercom functionality.

In yet another embodiment of the magnetic-resonance compatible intercom system, the sound transmitting unit further comprises a noise reduction module. The noise reduction module is configured to collect ambient noise and convert the ambient noise into a digital signal. The noise reduction module is connected to the second audio processor. The second audio processor is configured to generate the input signal based on the digital signal generated by the noise reduction module, so that the magnetic-resonance compatible earphone can emit a sound wave with the same amplitude as but opposite phase to the ambient noise. This enables active noise reduction.

In yet another embodiment of the magnetic-resonance compatible intercom system, the sound transmitting unit further comprises a constant-current audio amplifier. The constant current audio amplifier has an input end connected to the second audio codec and an output end connected to the magnetic-resonance compatible earphone. This enables interference from induced currents caused by gradient magnetic fields to be effectively reduced.

The present disclosure also provides a head coil apparatus comprising a body, two airbags, and two magnetic-resonance compatible earphones as described above. The body is used for accommodating an examination subject's head and for receiving magnetic resonance signals of the examination subject's head. The two airbags are provided on the body and respectively correspond to the two ears of the examination subject. Each one of the magnetic-resonance compatible earphones is connected to one of the air bags and used to transmit sound to the examination subject's ear. The airbag is configured to be inflated and deflated to adjust the distance between the magnetic-resonance compatible earphone and the examination subject's ear. This arrangement not only realizes the function of immobilizing the examination subject's head, but also that of the magnetic-resonance compatible earphone.

BRIEF DESCRIPTION OF THE DRAWINGS

The accompanying drawings below illustrate and explain the present disclosure schematically, without limiting the scope thereof.

KEY TO LABELS

Figure 1:
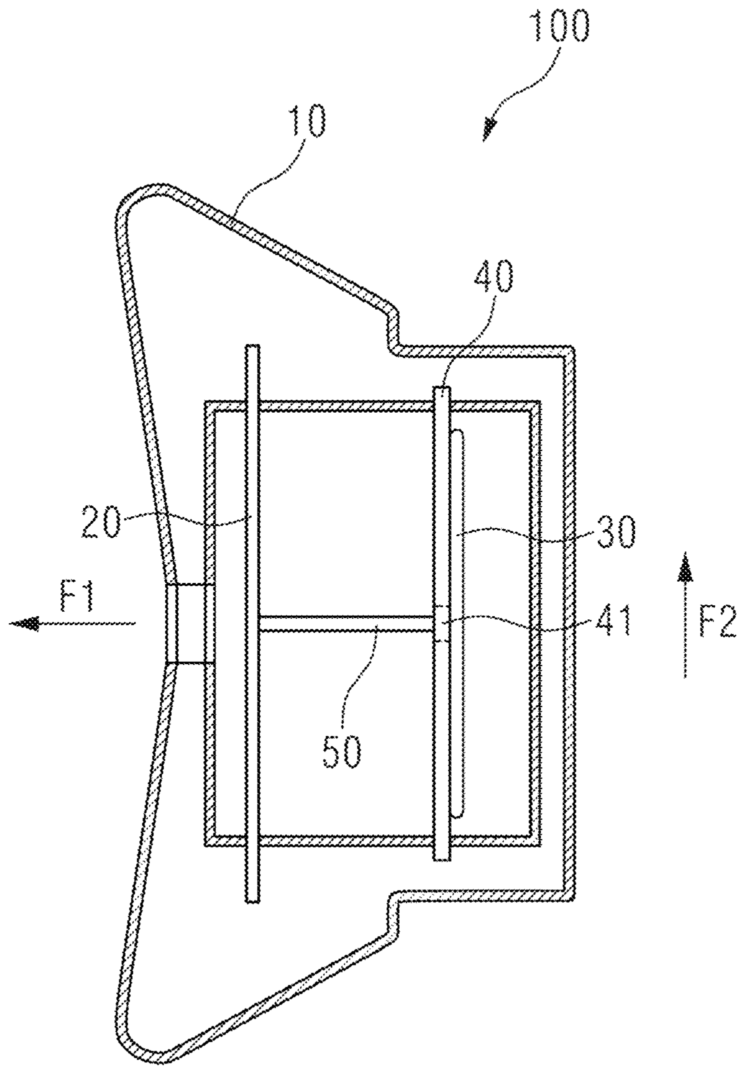
FIG. 1 is an example structural diagram of a magnetic-resonance compatible earphone, in accordance with an embodiment of the present disclosure.

10 headphone body
20 diaphragm
30 drive coil
31 winding unit
40 elastic sheet
41 connecting portion
50 transmission member
60 body
70 airbag
75 headrest
80 sound receiving unit
81 microphone
82 first audio codec
83 first audio processor
84 first wireless communication module
90 sound transmitting unit
91 second audio processor
92 second audio codec
93 second wireless communication module
94 noise reduction module
95 constant-current audio amplifier
100 magnetic-resonance compatible headphone
F1 output direction
F2 set magnetic field direction.

DETAILED DESCRIPTION OF THE DISCLOSURE

To enable a clearer understanding of the technical features, objectives, and effects of the disclosure, particular embodiments of the present disclosure are now explained with reference to the accompanying drawings, in which identical labels indicate structurally identical components or components with similar structures but identical functions.

As used herein, "schematic" means "serving as an instance, example or illustration". No drawing or embodiment described herein as "schematic" should be interpreted as a more preferred or more advantageous technical solution.

As used herein, "first" and "second", etc. do not indicate order or degree of importance, etc., merely being used to indicate a distinction between parts, to facilitate document descriptions.

To make the drawings appear uncluttered, only those parts relevant to the present disclosure are shown schematically in the drawings; they do not represent the actual structure thereof as a product.

FIG. 1 is an example structural diagram of a magnetic-resonance compatible earphone, in accordance with an embodiment of the present disclosure. As shown in FIG. 1, the magnetic-resonance compatible earphone 100 comprises an earphone body 10, a diaphragm 20, and a drive coil 30.

The diaphragm 20 is disposed on the earphone body 10 and is configured to generate sound through vibration. The drive coil 30 is disposed on the earphone body 10 and is configured to receive audio current. The drive coil 30 that has received the audio current is configured to generate a Lorentz force under the action of the main magnetic field of the magnetic resonance imaging system. The drive coil 30 is configured to drive the diaphragm 20 to vibrate by means of the Lorentz force generated by the drive coil.

Specifically, and as shown in FIG. 1, in this embodiment the magnetic-resonance compatible earphone 100 further comprises an elastic sheet 40 and a transmission member 50. The elastic sheet 40 is disposed on the earphone body 10. The drive coil 30 is fixed to the elastic sheet 40. The drive coil 30 is configured to drive the elastic sheet 40 to elastically deform by means of the Lorentz force generated by the drive coil. The transmission member 50 connects the elastic sheet 40 and the diaphragm 20. The elastic sheet 40 is configured to drive the transmission member 50 to move through elastic deformation. The moving transmission member 50 is configured to drive the diaphragm 20 to vibrate.

Figure 2:
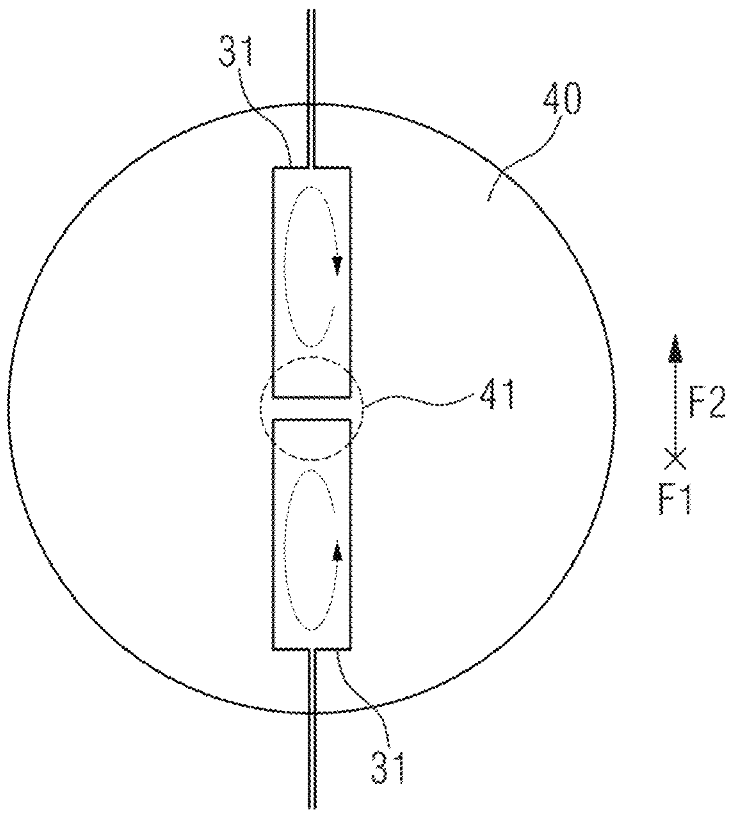
FIG. 2 illustrates an example drive coil of the magnetic-resonance compatible earphone shown in FIG. 1, in accordance with an embodiment of the present disclosure.

Further, and as shown in FIG. 1 and FIG. 2, in this embodiment, the elastic sheet 40 is in the form of a sheet and is arranged perpendicular to an audio output direction F1. The elastic sheet 40 is, for example, in the form of a circular sheet or rectangular sheet. An edge of the elastic sheet 40 is fixed to the earphone body 10. The elastic sheet 40 has a connecting portion 41 (for the convenience of description, the connecting portion 41 is schematically circled by a dotted line in the figure, but this is not used to limit the present disclosure). The connecting portion 41 can move in a direction parallel to the output direction F1 as the elastic sheet 40 deforms elastically. The transmission member 50 extends in the output direction F1, having one end connected to the connecting portion 41 and another end connected to the diaphragm 20.

In the present embodiment, the drive coil 30 has several pairs of winding units 31, which are stacked in the output direction F1; only one of these pairs of winding units 31 is shown in FIG. 2 by way of example and not limitation. Each winding unit 31 is wound along a plane perpendicular to the output direction F1. One end of the winding unit 31 in a set of winding units is fixed to the connecting portion 41. The magnetic field direction F2 is perpendicular to the output direction F1, and the winding unit 31 extends toward the edge of the elastic sheet 40 in a direction parallel to the set magnetic field direction F2. A pair of winding units 31 are arranged as mirror images (i.e. symmetrically arranged) across a plane perpendicular to the set magnetic field direction F2. Audio currents flow in opposite directions in the pair of winding units 31; i.e. in FIG. 2, one audio current is clockwise and the other audio current is counterclockwise.

In use, the set magnetic field direction F2 may be roughly parallel to the direction of the main magnetic field of the magnetic resonance imaging system, and the winding unit 31 that has received the audio current generates a Lorentz force parallel to the output direction F1 under the action of the main magnetic field of the magnetic resonance imaging system. Since the Lorentz forces generated by two ends of the winding unit 31 in the set magnetic field direction F2 are in opposite directions, these act to drive the connecting portion 41 to move in a direction parallel to the output direction F1, thereby causing the elastic sheet 40 to deform elastically, and in turn driving the diaphragm 20 to vibrate by means of the transmission member 50 to emit sound corresponding to the audio current.

The magnetic-resonance compatible earphone uses the main magnetic field of the magnetic resonance imaging system to cause the drive coil 30 to generate a Lorentz force, thereby driving the diaphragm to vibrate. The magnetic-resonance compatible earphone does not need to use permanent magnet components, and has good magnetic resonance compatibility.

In other embodiments, the drive coil 30 may be provided with only one pair of winding units 31 as required.

In the present embodiment, since the audio currents flow in opposite directions in the pair of winding units 31, the directions of the forces which they exert on the connection portion are the same. However, this is by way of example and not limitation. In other embodiments, the drive coil 30 may be provided with only one winding unit 31 as needed.

Figure 3:
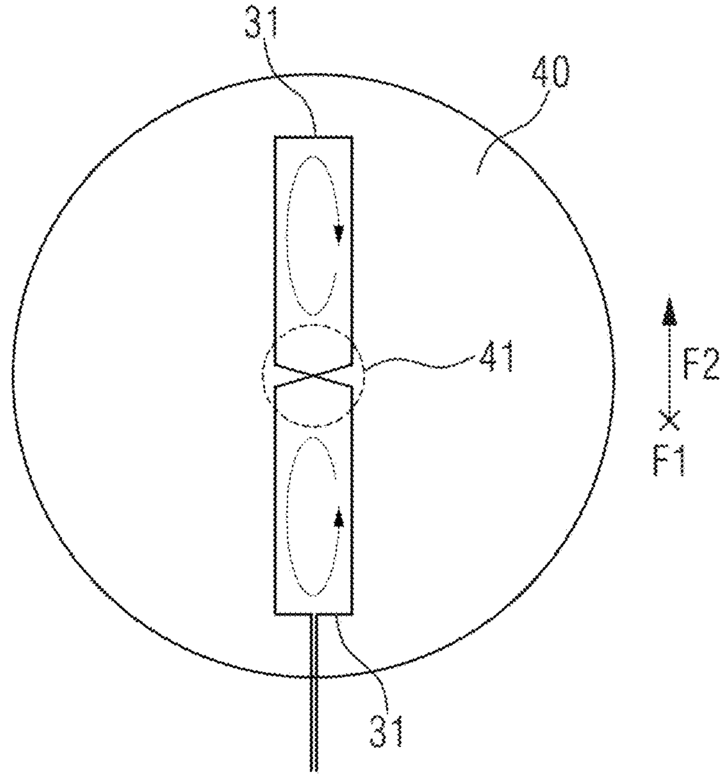
FIG. 3 illustrates another example drive coil, in accordance with an embodiment of the present disclosure.

In the present embodiment, the pair of winding units 31 are respectively formed by winding two lengths of conductive wire (these two lengths of conductive wire will eventually be connected in series). However, this is by way of example and not limitation. In other schematic embodiments, as shown in FIG. 3, the pair of winding units 31 can also be formed by continuous winding of one length of conductive wire, the winding path thereof being similar to the writing of the number "8". This allows for induced potentials that are generated under gradient magnetic fields to cancel each other out.

Figure 4:
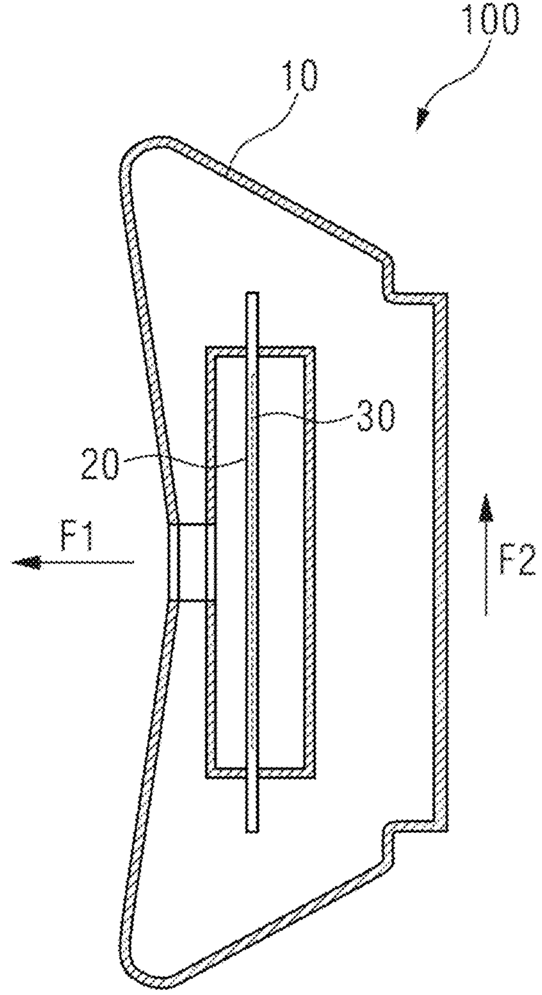
FIG. 4 illustrates an example structural diagram of another magnetic-resonance compatible earphone, in accordance with an embodiment of the present disclosure.

FIG. 4 illustrates an example structural diagram of another magnetic-resonance compatible earphone, in accordance with an embodiment of the present disclosure. As shown in FIG. 4, in this embodiment the magnetic-resonance compatible earphone 100 comprises an earphone body 10, a diaphragm 20, and a drive coil 30.

The diaphragm 20 and the drive coil 30 are integrated as a flexible circuit board and disposed on the earphone body 10. The diaphragm 20 comprises a flexible substrate of the flexible circuit board, and is configured to generate sound through vibration. The drive coil 30 comprises a circuit in the flexible circuit board, and is configured to receive audio current. Having received the audio current, the drive coil 30 is configured to generate a Lorentz force under the action of the main magnetic field of the magnetic resonance imaging system. The drive coil 30 is configured to drive the diaphragm 20 to vibrate by means of the Lorentz force generated by the drive coil. This structure is more compact.

Figure 5:
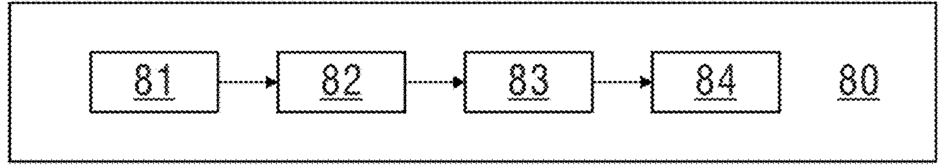
FIG. 5 illustrates an example structural block diagram of a magnetic-resonance compatible intercom system, in accordance with an embodiment of the present disclosure.
Figure 5:
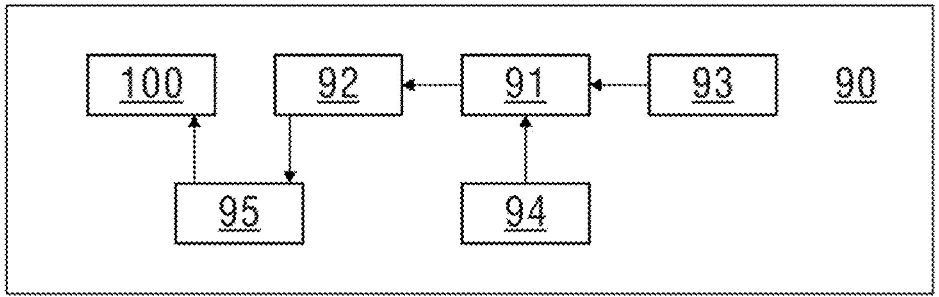

FIG. 5 illustrates an example structural block diagram of a magnetic-resonance compatible intercom system, in accordance with an embodiment of the present disclosure. As shown in FIG. 5, the magnetic-resonance compatible intercom system comprises a sound receiving unit 80 (e.g. a sound receiver) and a sound transmitting unit 90 (e.g. a sound transmitter).

The sound receiving unit 80 comprises a microphone 81, a first audio codec 82, and a first audio processor 83. The microphone 81 is configured to convert a sound signal into an analog signal. The first audio codec 82 is configured to generate a digital signal based on the analog signal generated by the microphone 81. The first audio processor 83 is configured to generate an output signal based on the digital signal generated by the first audio codec 82.

The sound transmitting unit 90 comprises a second audio processor 91, a second audio codec 92, and a magnetic-resonance compatible earphone 100 as shown in FIG. 1 or FIG. 4. The second audio processor 91 is configured to generate an input signal based on the output signal generated by the first audio processor 83. The second audio codec 92 is configured to generate an analog signal based on the input signal. The magnetic-resonance compatible earphone 100 is configured to emit sound according to the analog signal generated by the second audio codec 92.

In use, the sound receiving unit 80 is, for example, located outside the detection region of the magnetic resonance imaging system, and has no magnetic resonance compatibility requirements. The second audio processor 91 and second audio codec 92 of the sound transmitting unit 90 are, for example, disposed on the earphone body 10 of the magnetic-resonance compatible earphone 100, and are, for example, located in the detection region of the magnetic resonance imaging system when in use.

The magnetic-resonance compatible earphone of the magnetic-resonance compatible intercom system utilizes the main magnetic field of the magnetic resonance imaging system to cause the drive coil to generate a Lorentz force, thereby driving the diaphragm to vibrate. The magnetic-resonance compatible earphone does not need to use permanent magnet components, so the magnetic-resonance compatible intercom system has good magnetic resonance compatibility.

As shown in FIG. 5, in an embodiment, the magnetic-resonance compatible intercom system further comprises a first wireless communication module 84 (e.g. wireless communication circuitry) and a second wireless communication module 93 (e.g. wireless communication circuitry). The first wireless communication module 84 is connected to the first audio processor 83. The second wireless communication module 93 is connected to the second audio processor 91. The first audio processor 83 and the second audio processor 91 are configured to transmit signals by wireless communication via the first wireless communication module 84 and the second wireless communication module 93. This enables wireless intercom functionality. The second wireless communication module 93 is provided, for example, on the earphone body 10 of the magnetic-resonance compatible earphone 100.

As shown in FIG. 5, in an embodiment, the sound transmitting unit 90 further comprises a noise reduction module 94 (e.g. noise reduction circuitry). The noise reduction module 94 is configured to collect ambient noise and convert the ambient noise into a digital signal. The noise reduction module 94 is connected to the second audio processor 91. The second audio processor 91 is configured to generate an input signal according to the digital signal generated by the noise reduction module 94, so that the magnetic-resonance compatible earphone 100 emits a sound wave with the same amplitude as but opposite phase to the ambient noise. This enables active noise reduction.

As shown in FIG. 5, in an embodiment, the sound transmitting unit 90 further comprises a constant-current audio amplifier 95. An input end of the constant-current audio amplifier 95 is connected to the second audio codec 92, and an output end is connected to the magnetic-resonance compatible earphone 100. Since the constant-current audio amplifier 95 uses current as negative feedback, the constant-current audio amplifier 95 can effectively reduce interference from induced currents caused by gradient magnetic fields.

In other embodiments, a battery may also be provided in the sound receiving unit 80 and/or the sound transmitting unit 90 to provide electrical energy, or a crystal oscillator may be provided in the sound receiving unit 80 and/or the sound transmitting unit 90 to improve the signal stability.

Figure 6:
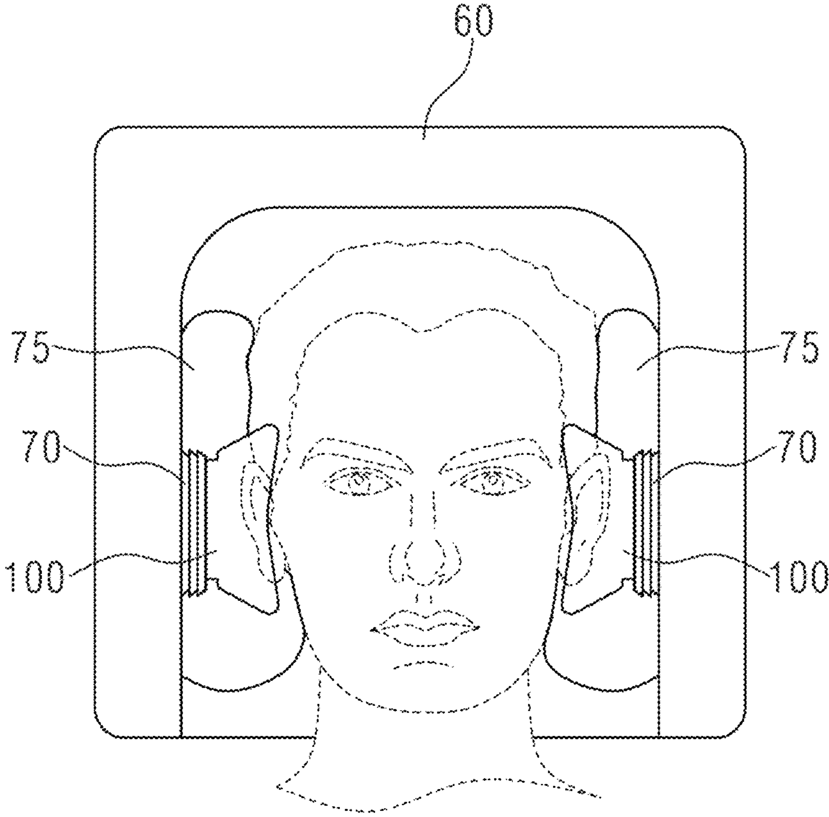
FIG. 6 illustrates an example structural diagram of a head coil apparatus, in accordance with an embodiment of the present disclosure.

FIG. 6 illustrates an example structural diagram of a head coil apparatus, in accordance with an embodiment of the present disclosure. As shown in FIG. 6, the head coil apparatus comprises a body 60, two airbags 70, and two magnetic-resonance compatible earphones 100 as shown in FIG. 1 or FIG. 4. The body 60 is used for accommodating the examination subject's head and receiving magnetic resonance signals of the examination subject's head. The two airbags 70 are disposed on the body 60 and correspond to the two ears of the examination subject, respectively. Each magnetic-resonance compatible earphone 100 is connected to one airbag 70, and is used to transmit sound toward the examination subject's ear. The airbag 70 can be inflated and deflated to adjust the distance between the magnetic-resonance compatible earphone 100 and the examination subject's ear, so as to immobilize the examination subject's head by a squeezing action. The airbag 70 may be, for example, an extending/retracting airbag. Such a design not only realizes the function of immobilizing the examination subject's head, but also provides the functionality of the magnetic-resonance compatible earphone described above.

In a schematic embodiment, the head coil apparatus further comprises, for example, a pair of headrests 75 for assisting in immobilizing the examination subject's head.

It should be understood that although the description herein is based on various embodiments, it is by no means the case that each embodiment contains just one independent technical solution. Such a method of presentation is adopted herein purely for the sake of clarity. Those skilled in the art should consider the description in its entirety. The technical solutions in the various embodiments could also be suitably combined to form other embodiments understandable to those skilled in the art.

The series of detailed explanations set out above are merely particular explanations of feasible embodiments of the present disclosure, which are not intended to limit the scope of protection thereof. All equivalent embodiments or changes made without departing from the artistic spirit of the present disclosure, such as combinations, divisions or repetitions of features, shall be included in the scope of protection of the present disclosure.

The various components described herein may be referred to as "units," "apparatuses," or "modules". Such components may be implemented via any suitable combination of hardware and/or software components as applicable and/or known to achieve the intended respective functionality. This may include mechanical and/or electrical components, processors, processing circuitry, or other suitable hardware components, in addition to or instead of those discussed herein. Such components may be configured to operate independently, or configured to execute instructions or computer programs that are stored on a suitable computer readable medium. Regardless of the particular implementation, such devices, units, and facilities, as applicable and relevant, may alternatively be referred to herein as "circuitry," "processors," or "processing circuitry," or alternatively as noted herein.

What is claimed is:

1. A magnetic-resonance imaging system compatible earphone, comprising:

an earphone body;

a diaphragm disposed on the earphone body;

a drive coil disposed on the earphone body, the drive coil being configured to receive audio current;

an elastic sheet disposed on the earphone body, the drive coil being fixed to the elastic sheet; and a transmission member connecting the elastic sheet and the diaphragm, wherein upon receiving the audio current, the drive coil is configured to generate a Lorentz force in response to a main magnetic field that is generated via a magnetic resonance imaging system, wherein the drive coil is configured to cause, via the Lorentz force generated by the drive coil, the elastic sheet to elastically deform to induce movement in the transmission member, and wherein the movement of the transmission member drives the diaphragm to thereby generate sound via vibration.

2. The magnetic-resonance imaging system compatible earphone as claimed in claim 1, wherein:

the elastic sheet is arranged perpendicular to an output direction of the magnetic-resonance imaging system compatible earphone, an edge of the elastic sheet is fixed to the earphone body, the elastic sheet comprises a connecting portion that is configured to move in a direction parallel to the output direction as the elastic sheet deforms, and the transmission member extends in the output direction, having one end connected to the connecting portion and another end connected to the diaphragm.

3. The magnetic-resonance imaging system compatible earphone as claimed in claim 2, wherein:

the drive coil comprises an annular winding that is wound along a plane perpendicular to the output direction, one end of the annular winding is fixed to the connecting portion, the annular winding extends toward an edge of the elastic sheet in a direction parallel to a predetermined magnetic field direction, and the predetermined magnetic field direction is perpendicular to the output direction.

4. The magnetic-resonance imaging system compatible earphone as claimed in claim 3, wherein:

the drive coil comprises a pair of annular windings, the pair of annular windings are arranged symmetrically across a plane that is perpendicular to the predetermined magnetic field direction, and audio currents flow in opposite directions in each respective winding of the pair of annular windings.

5. The magnetic-resonance imaging system compatible earphone as claimed in claim 4, wherein the pair of annular windings is formed by continuously winding a length of conductive wire.

6. The magnetic-resonance imaging system compatible earphone as claimed in claim 1, wherein the diaphragm and the drive coil are integrated as a flexible circuit board.

7. The magnetic-resonance imaging system compatible earphone as claimed in claim 1, wherein the drive coil is configured to drive the diaphragm to vibrate via the Lorentz force generated by the drive coil without permanent magnets.

8. The magnetic-resonance imaging system compatible earphone as claimed in claim 1, wherein the drive coil is configured to generate the Lorentz force via generation of a magnetic field having a direction that is parallel to the main magnetic field of a magnetic resonance imaging system.

9. The magnetic-resonance imaging system compatible earphone as claimed in claim 1, wherein the drive coil comprises a pair of annular windings that are wound along a plane perpendicular to an audio output direction, and wherein the Lorentz force generated by the drive coil is parallel with the audio output direction.

10. The magnetic-resonance imaging system compatible earphone as claimed in claim 1, wherein each of the earphone body, the diaphragm, and the drive coil is magnetic resonance compatible to facilitate the magnetic-resonance imaging system compatible earphone functioning during a magnetic resonance examination.

11. The magnetic-resonance imaging system compatible earphone as claimed in claim 1, wherein the earphone does not include a permanent magnet.

12. The magnetic-resonance imaging system compatible earphone as claimed in claim 11, wherein the drive coil is configured to generate the Lorentz force exclusively in response to the main magnetic field generated via the magnetic resonance imaging system without any magnetic field being generated by components of the earphone.

13. The magnetic-resonance imaging system compatible earphone as claimed in claim 1, wherein the drive coil is configured to operate during a magnetic resonance imaging examination of a patient while being worn by the patient.

14. The magnetic-resonance imaging system compatible earphone as claimed in claim 1, wherein the drive coil is configured to generate the Lorentz force exclusively in response to the main magnetic field generated via the magnetic resonance imaging system without any magnetic field being generated by components of the earphone.

15. A magnetic-resonance imaging system compatible intercom system, comprising:

a sound receiver, comprising:

a microphone configured to convert an audio signal to an analog signal, a first audio codec configured to generate a digital signal based on the analog signal generated by the microphone, and a first audio processor configured to generate an output signal based on the digital signal generated by the first audio codec; and a sound transmitter, comprising:

a second audio processor configured to generate an input signal based on the output signal generated by the first audio processor;

a second audio codec configured to generate an analog signal based on the input signal; and a magnetic-resonance imaging system compatible earphone configured to emit sound according to the analog signal generated by the second audio codec, the magnetic-resonance imaging system compatible earphone comprising:

an earphone body;

a diaphragm arranged on the earphone body;

a drive coil arranged on the earphone body, the drive coil being configured to receive audio current;

an elastic sheet disposed on the earphone body, the drive coil being fixed to the elastic sheet; and a transmission member connecting the elastic sheet and the diaphragm, wherein upon receiving the audio current, the drive coil is configured to generate a Lorentz force in response a main magnetic field that is generated via a magnetic resonance imaging system, wherein the drive coil is configured to cause, via the Lorentz force generated by the drive coil, the elastic sheet to elastically deform to induce movement in the transmission member, and wherein the movement of the transmission member drives the diaphragm to thereby generate sound via vibration.

16. The magnetic-resonance imaging system compatible intercom system as claimed in claim 15, further comprising:

first wireless communication circuitry connected to the first audio processor; and second wireless communication circuitry connected to the second audio processor, wherein the first audio processor and the second audio processor are configured to cause a transmission of signals, respectively, via wireless communication using the first wireless communication circuitry and the second wireless communication circuitry.

17. The magnetic-resonance imaging system compatible intercom system as claimed in claim 15, wherein:

the sound transmitter further comprises noise reduction circuitry configured to collect ambient noise and to convert the ambient noise into a further digital signal, the noise reduction circuitry is connected to the second audio processor, and the second audio processor is configured to generate the input signal based on the further digital signal generated by the noise reduction circuitry such that the magnetic-resonance imaging system compatible earphone emits a sound wave having the same amplitude but an opposite phase as a sound wave of the ambient noise.

18. The magnetic-resonance imaging system compatible intercom system as claimed in claim 15, wherein the sound transmitter further comprises a constant-current audio amplifier comprising an input end connected to the second audio codec and an output end connected to the magnetic-resonance compatible earphone.

19. A head coil, comprising:

a body configured to accommodate a head of an examination subject and to receive magnetic resonance signals of the head of the examination subject;

a set of airbags, each one of the set of airbags being disposed on the body and respectively corresponding to two ears of the examination subject; and a set of magnetic-resonance imaging system compatible earphones, each one of the set of magnetic-resonance imaging system compatible earphones comprising:

an earphone body;

a diaphragm arranged on the earphone body;

a drive coil arranged on the earphone body, the drive coil being configured to receive audio current;

an elastic sheet disposed on the earphone body, the drive coil being fixed to the elastic sheet; and a transmission member connecting the elastic sheet and the diaphragm, wherein upon receiving the audio current, the drive coil is configured to generate a Lorentz force in response to a main magnetic field that is generated via a magnetic resonance imaging system, wherein the drive coil is configured to cause, via the Lorentz force generated by the drive coil, the elastic sheet to elastically deform to induce movement in the transmission member, and wherein the movement of the transmission member drives the diaphragm to thereby generate sound via vibration, wherein each one of the set of magnetic-resonance imaging system compatible earphones is respectively connected to each one of the set of air bags and configured to transmit sound to the two ears of the examination subject, and wherein each one of the set of airbags is configured to be inflated and deflated to adjust a distance between each one of the set of the magnetic-resonance compatible earphones and a respective one of the two ears of the examination subject.

* * * * *